US 6,491,073 B1

(12) United States Patent
Essick

(10) Patent No.: US 6,491,073 B1
(45) Date of Patent: Dec. 10, 2002

(54) MULTI-POSITION BISCUIT CUTTING GUIDE

(76) Inventor: Dugan Essick, 3577 Thacher Rd., Ojai, CA (US) 93023

( * ) Notice: Subject to any disclaimer, the term of this patent is extended or adjusted under 35 U.S.C. 154(b) by 0 days.

(21) Appl. No.: 09/921,370

(22) Filed: Jul. 31, 2001

(51) Int. Cl.$^7$ ................................................ B27C 5/00
(52) U.S. Cl. ........................ 144/144.51; 33/197; 33/562; 33/638; 144/144.51; 144/144.52
(58) Field of Search ...................... 33/194, 197, 562, 33/638; 144/85–87, 144.1, 144.51, 144.52, 372

(56) References Cited

U.S. PATENT DOCUMENTS

| | | | |
|---|---|---|---|
| 4,905,745 A | 3/1990 | Jaeger | 144/134 |
| 4,914,822 A * | 4/1990 | Wetherington | 33/197 |
| 5,018,562 A | 5/1991 | Adams | 144/253.1 |
| 5,768,966 A | 6/1998 | Duginske | 83/468.7 |
| 5,779,407 A | 7/1998 | Tucker et al. | 409/218 |
| 5,816,300 A | 10/1998 | Rogers | 144/136.95 |
| 5,890,524 A | 4/1999 | Tucker et al. | 144/371 |
| 5,988,242 A | 11/1999 | Minardi | 144/253.2 |
| 6,061,921 A | 5/2000 | Adams et al. | 33/638 |
| 6,206,060 B1 | 3/2001 | Blake | 144/87 |

* cited by examiner

Primary Examiner—W. Donald Bray
(74) Attorney, Agent, or Firm—Lyon & Harr; Mark A. Watson

(57) ABSTRACT

An adjustable multi-position biscuit cutting guide according to present invention is embodied in an elongated rectangular member, or body, having a plurality of slidably adjustable guide members disposed along its length. A graduated scale is disposed along one surface of the body of the biscuit cutting guide for use in positioning one or more of the adjustable guide members along the length of the body. Further, slidably adjustable stop blocks or clamping members are disposed along either end of the body for securely holding a work piece in position relative to the slidably adjustable guide members. A plate joiner tool or the like is then used for cutting one or more plate or biscuit slots into the work piece in alignment with centering marks which are disposed on the surface of each of the slidably adjustable guide members.

24 Claims, 4 Drawing Sheets

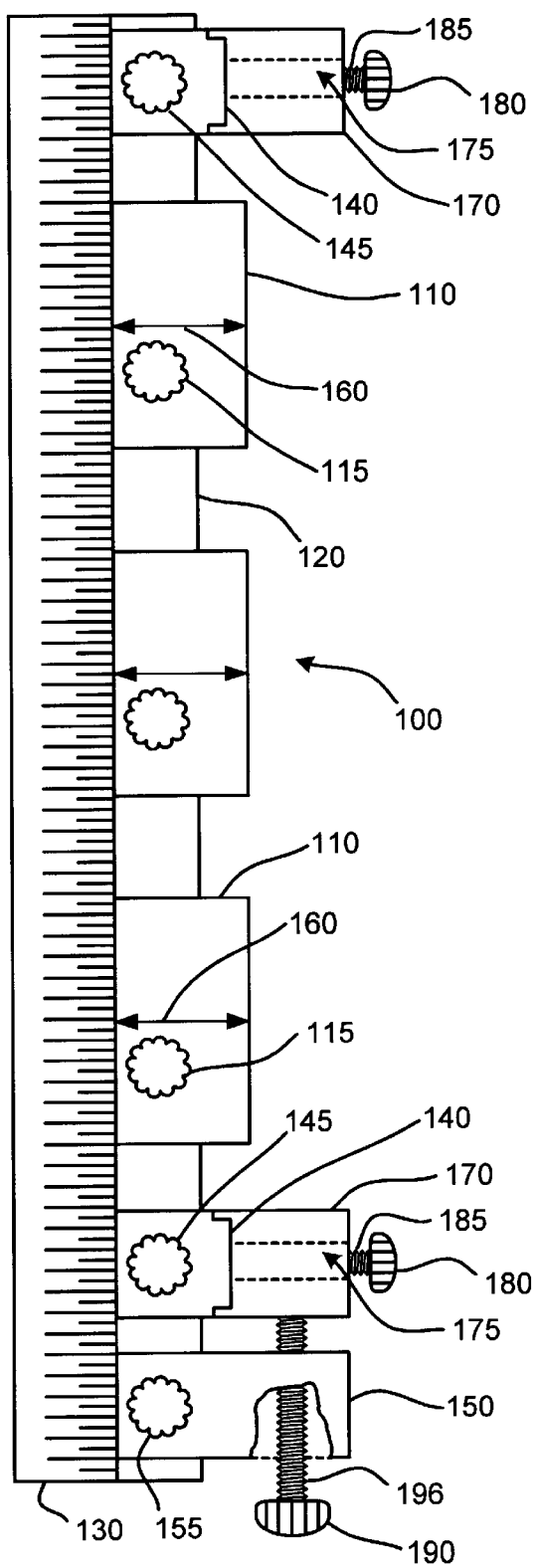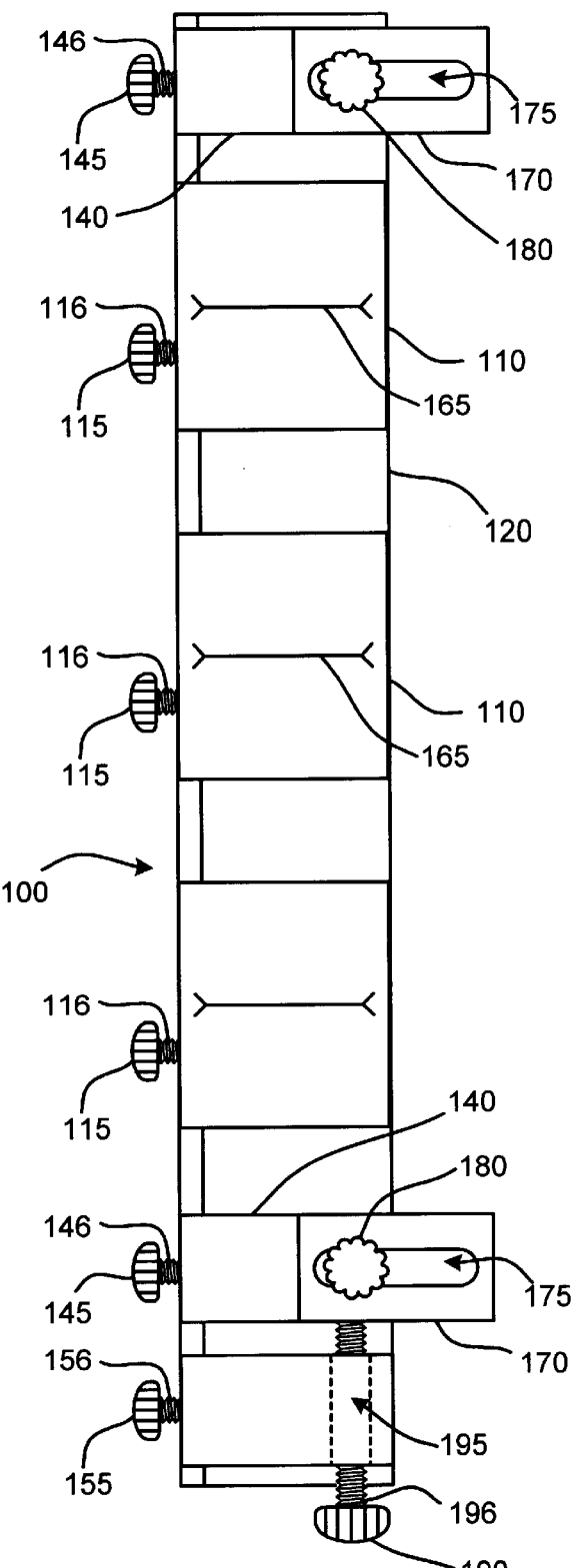
FIG. 1                    FIG. 2

MULTI-POSITION BISCUIT CUTTING GUIDE

BACKGROUND

1. Technical Field

This invention relates to an adjustable guide for enabling accurate and repeatable cutting of one or more plate or biscuit slots within one or more work pieces using a plate joiner tool or the like.

2. Related Art

By way of background, work pieces, such as wood or any other material capable of being "worked" or cut with conventional woodworking type tools and joined with an adhesive are often joined together using any of a number of techniques. One popular technique for assisting in securely joining two pieces of material together involves the use of a tool known as a "plate joiner" or "biscuit joiner."

A typical plate joiner is a power tool having a rotating circular blade, the edge of which is typically spring loaded for allowing the edge of the rotating blade to be pushed a predetermined depth into a work piece, thereby cutting a semicircular slot within the work piece. This step is repeated until a desired number of slots are cut into the work piece. Matching semicircular slots are then cut into a corresponding work piece, again using the plate joiner. Next, an adhesive is typically placed into each of the slots cut into each of the work pieces, and often directly onto flat, oval-shaped plates or "biscuits." These biscuits typically have a thickness marginally less than the rotating blade of the plate joiner, and typically expand slightly after contacting the adhesive so that they will fit snugly within the slots.

The biscuits are then typically inserted into each of slots within one of the work pieces, such that approximately one-half of each biscuit extends from the slot in the first work piece thereby allowing each biscuit to also be inserted into the corresponding slot on the second work piece. Finally, the slots within the second work piece are aligned with the biscuits inserted into the first work piece so that the biscuits serve to join the two work pieces together by simultaneously partially residing within the corresponding slots cut within the joined work pieces. The work pieces are then often clamped or otherwise secured until the adhesive cures. Once the adhesive cures, a strong bond between the work pieces is achieved as a result of the biscuits joining the work pieces in combination with the adhesive.

Types of joints commonly created using the plate joiner include, for example, "edge to edge joints," i.e., table tops or other flat surfaces, "miter joints," i.e., joints at the corners of picture frames, "butt joinery," i.e., two work pieces joined end to end, "corner joints," i.e., drawers, and "T-joints," i.e., work pieces at 90 degrees forming a book shelf or the like. Clearly, other joint types are possible, including joints at any desired angle. Typically, when creating any joint using a plate joiner, corresponding slots are cut by first aligning the work pieces in the positions that they will have after being joined. Next, a line corresponding to a desired centerline for each biscuit that will be used to join the two work pieces is drawn or marked onto the surface of one work piece and extended onto the corresponding work piece. The work pieces are then separated. The lines are then matched to a centering mark on the plate joiner tool that is used to cut each of the corresponding slots in the manner described above.

One common problem associated with plate joiners is ensuring the accuracy of cutting corresponding slots within work pieces, such that the work pieces joined with biscuits will line up in the desired manner. While aligning the centering mark on the plate joiner with lines drawn on the work pieces typically provides reasonable accuracy, several problems exist with this technique. First, the method described works well when cutting slots into the edge of a work piece, as both the work piece and the plate joiner are typically resting on a flat surface while cutting the slots. However, when cutting slots into the surface of a work piece, such as with a T-joint, the alignment and the spatial rotation of the plate joiner is more critical. For example, when cutting a slot into the surface of a work piece, if the plate joiner is slightly rotated relative to the desired angle for the biscuit slot, it is likely that the slots in the work pieces of the T-joint will not properly align.

However, a more serious concern is repeatability of cuts when cutting identical slots in multiple members, such as when more than one set of work pieces are to be joined. This problem often arises when building more than one of the same item, such as, for example more than one cabinet, bookshelf, table, etc., where one or more work pieces having identical biscuit slots must be produced, along with one or more corresponding work pieces having matching slots. Clearly, taking the time to individually align work pieces to mark the centerline for each biscuit slot can become very time consuming as the number of work pieces increases.

Therefore, in order to overcome the limitations of current plate joiners, what is needed is a an apparatus for allowing accurate repeatability of slot cuts, along with proper alignment of slots in corresponding work pieces without the need to first align individual work pieces with corresponding work pieces for marking slot centerlines. Further, such an apparatus should ensure proper rotational alignment of the plate joiner when cutting biscuit slots into the surface of a work piece.

SUMMARY

The present invention involves an adjustable multi-position biscuit cutting guide or "jig" which satisfies all of the foregoing needs. In general, the adjustable biscuit cutting guide of the present invention satisfies the foregoing needs by enabling accurate and repeatable cutting of one or more plate or biscuit slots within one or more work pieces using a plate joiner tool or the like. Further, this multi-position biscuit cutting guide allows for accurate and repeatable cutting of one or more plate or biscuit slots within corresponding work pieces without the need to first align the corresponding work pieces to mark desired centerline locations for matching or corresponding biscuit slots. Finally, the multi-position biscuit cutting guide of the present invention also ensures proper rotational orientation of the plate joiner tool when cutting biscuit slots into the surface of a work piece.

A multi-position biscuit cutting guide according to present invention is embodied in an elongated rail member, or body, having a plurality of slidably adjustable guide members disposed along its length. Further, a graduated distance indicator disposed along one surface of the body of the biscuit cutting guide provides a measurement indicator or "scale" for use in positioning one or more of the adjustable guide members along the length of the body. In addition, a slidably adjustable stop block or clamping member is disposed along either end of the body for the purpose of securely holding a work piece in position relative to the slidably adjustable guide members. These clamping members may also be positioned with respect to the scale.

In operation, a plate joiner tool or the like is used to cut one or more plate or biscuit slots within a work piece which is held in position relative to the slidably adjustable guide members. In particular, one or more of the guide blocks is first positioned along the length of the body with respect to desired positions as indicated by use of the scale disposed on the surface of the body. Each of these guide blocks further includes a centerline marking along a front face, and in one embodiment along a top face, to allow for centering of the plate joiner tool with respect to each guide member. Once the plate joiner tool has been centered against the guide member, the plate joiner tool is used to cut one or more plate or biscuit slots into a first work piece in positions corresponding to the centerlines of the guide members.

Once the plate or biscuit slots have been cut into the work piece, that work piece is removed from the multi-position biscuit cutting guide, and a corresponding work piece is then placed into the multi-position biscuit cutting guide. So long as the stop blocks and slidably adjustable guides are not repositioned when adding a new work piece to the multi-position biscuit cutting guide, any plate or biscuit slots cut into subsequent work pieces will be in exact alignment with slots cut into prior work pieces. In this manner, the multi-position biscuit cutting guide allows for cutting of plate or biscuit slots into corresponding work pieces, which may then be joined using adhesives and plates or biscuits in a conventional manner.

Further, because adjustment of the guide members and stop blocks or clamps need only be done once, any number of identical or corresponding work pieces may have plate or biscuit slots cut into their surfaces without the need to measure or mark the desired positions of those slots on each work piece. Further, once the multi-position biscuit cutting guide has been placed into the desired configuration, it does not require further adjustment to be used with any number of work pieces. Consequently, use of such a multi-position biscuit cutting guide serves to increase accuracy and alignment of cutting biscuit slots into corresponding work pieces while simultaneously reducing production time, and thus cost, when cutting biscuit slots into identical or corresponding work pieces.

The foregoing and still further features and advantages of the present invention as well as a more complete understanding thereof will be made apparent from a study of the following detailed description of the invention in connection with the accompanying drawings and appended claims.

DESCRIPTION OF THE DRAWINGS

The specific features, aspects, and advantages of the present invention will become better understood with regard to the following description, appended claims, and accompanying drawings which like reference numbers represent corresponding parts throughout.

FIG. 1 is an exemplary top view, partially broken away, of a multi-position biscuit cutting guide according to the present invention.

FIG. 2 is a front view of the multi-position biscuit cutting guide of FIG. 1.

DETAILED DESCRIPTION OF THE PREFERRED EMBODIMENTS

Figures 3, 4:
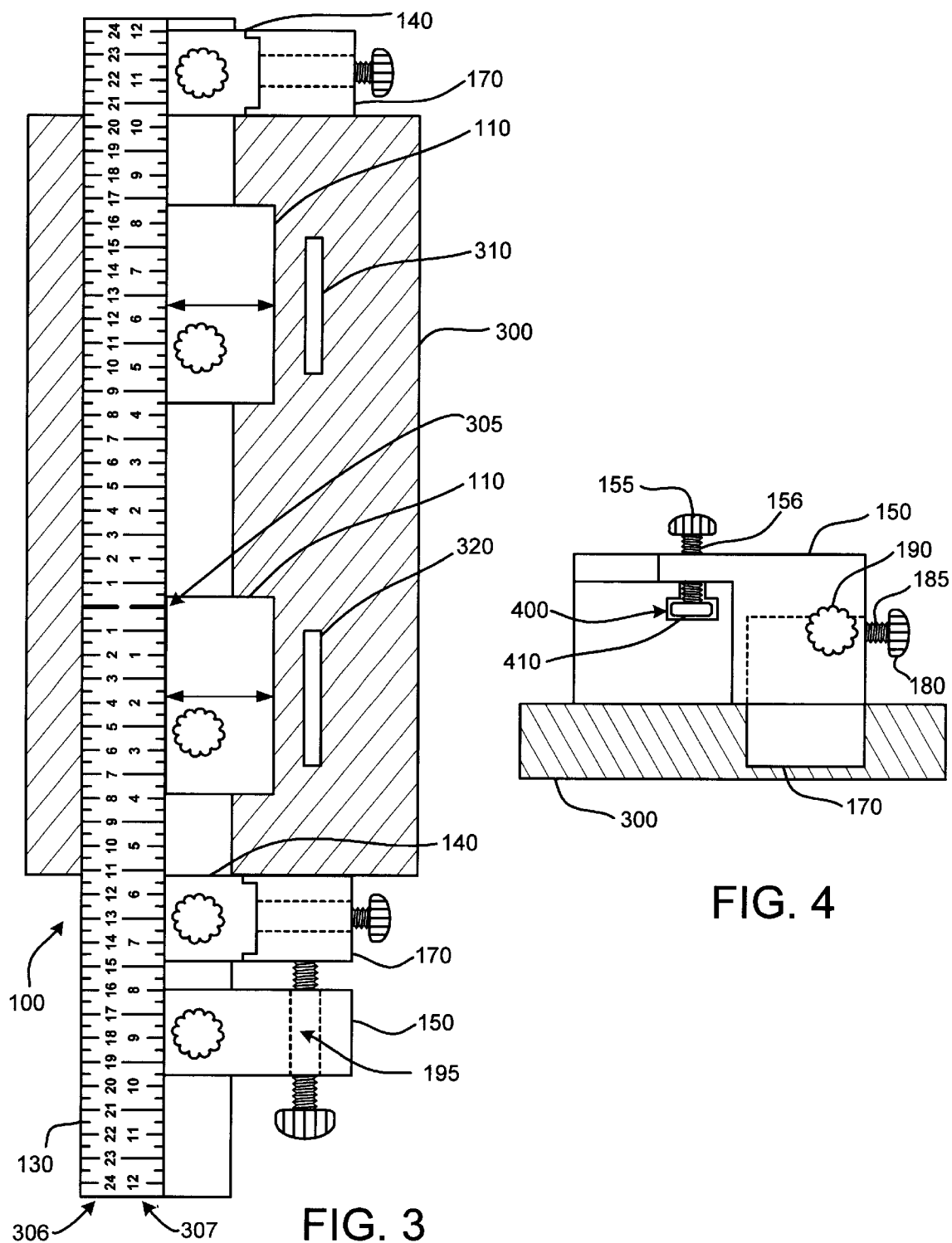
FIG. 3 is a top view of an alternate embodiment of a multi-position biscuit cutting guide having a dual scale for positioning elements of the guide, shown holding a work piece in position for cutting biscuit slots into a surface of the work piece in accordance with the present invention.
FIG. 4 is a side view of the multi-position biscuit cutting guide of FIG. 3 shown with the work piece clamped in place for cutting biscuit slots into the surface of the work piece.

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Introduction

A multi-position biscuit cutting guide according to the present invention includes a plurality of slidably adjustable guide members for enabling accurate and repeatable cutting of one or more plate or biscuit slots within one or more work pieces using a plate joiner tool or the like. Further, this multi-position biscuit cutting guide allows for accurate and repeatable cutting of one or more plate or biscuit slots within corresponding work pieces without the need to first align the corresponding work pieces to mark desired centerline locations for matching or corresponding biscuit slots.

A multi-position biscuit cutting guide according to present invention is embodied in an elongated rectangular member, or body, having a plurality of slidably adjustable guide members disposed along its length. Further, a graduated distance indicator disposed along one surface of the body of the biscuit cutting guide provides a measurement indicator or "scale" for use in positioning one or more of the adjustable guide members along the length of the body. In addition, a slidably adjustable stop block or clamping member is disposed along either end of the body for the purpose of securely holding a work piece in position relative to the slidably adjustable guide members while cutting biscuit slots in the work piece with a plate joiner tool or the like.

Components

As illustrated in FIG. 1 and FIG. 2, the multi-position biscuit cutting guide 100 includes a plurality of slidably adjustable guide blocks 110 disposed along a longitudinal rail member forming a body 120 of the biscuit cutting guide. A graduated distance indicator or "scale" 130 is disposed along one surface of the body 120 of the biscuit cutting guide 100 for use in positioning one or more of the slidably adjustable guide blocks 110 along the length of the body. In addition, a slidably adjustable stop block or clamping member 140 is slidably disposed along either end of the body 120 for the purpose of securely holding a work piece in position relative to the slidably adjustable guide blocks.

Further, in one embodiment, as illustrated by FIG. 1 and FIG. 2, a clamping member adjustment block 150 is slidably disposed along one end of the body 120 in association with one of the clamping members 140. The clamping member adjustment block 150 is used for making fine adjustments to the adjacent clamping member 140 for the purpose of more securely holding work pieces in place during use of the multi-position biscuit cutting guide 100. Further, in additional related embodiments, other conventional clamping mechanisms, not shown, may be coupled to the body 120 of the multi-position biscuit cutting guide 100 in place of the slidably adjustable clamping members 140 and the clamping member adjustment block 150 for the purpose of holding a work piece in position during use of the multi-position biscuit cutting guide.

In a working model of the present invention, the longitudinal rail member forming the body 120 of the multi-position biscuit cutting guide 100 is sized to be used for cutting biscuit slots into work pieces used for forming standard sized kitchen cabinets and the like. However, clearly the longitudinal rail member forming the body 120 of the multi-position biscuit cutting guide 100 can be constructed in any desired length so as to be used with work pieces of any length or width. Further, as the length of the body 120 is increased, additional slidably adjustable guide blocks 110 may be added to the body in order to allow for cutting of as many biscuit slots as desired. Similarly, slidably adjustable guide blocks 110 may also be removed from the body 120 in order to accommodate smaller work pieces between the slidably adjustable clamping members 140. In addition, the longitudinal rail member 120 forming the body of the multi-position biscuit cutting guide 100 includes at least one slot or groove (See 400 of FIG. 4) in its surface for receiving each of the slidably adjustable guide blocks 110, the slidably adjustable clamping members 140, and the clamping member adjustment block 150.

In particular, each of the slidably adjustable guide blocks 110 include a tightening knob 115 which further includes a threaded shaft 116 extending through the surface of each of the slidably adjustable guide blocks and into the slot (400 of FIG. 4) of the body 120 of the multi-position biscuit cutting guide 100. Each threaded shaft 116 of the tightening knob 115 is threaded into a slidable retention member (410 of FIG. 4) disposed within the slot (400 of FIG. 4). As the tightening knob 115 is rotated clockwise, the threaded shaft extends into the slidable retention member 410 and forces it into a tight frictional engagement with the walls of the slot. In this manner, the slidably adjustable guide blocks 110 are prevented from moving once positioned in the desired location. Rotating the tightening knob 115 counterclockwise serves to free the slidable retention member (410 of FIG. 4) from the tight frictional engagement with the walls of the slot (400 of FIG. 4), so that the slidably adjustable guide block 110 is free to be repositioned.

It should be appreciated by those skilled in the art that other conventional means for securing or otherwise holding the slidably adjustable guide blocks 110 in place may be used in place of the combination of the tightening knob 115 and the slidable retention member 410. For example, a ratchet system for incrementally moving the slidably adjustable guide blocks 110 along the length of the body 120 can be used. Alternatively, a conventional clamping mechanism can be used to secure the slidably adjustable guide blocks 110 in position along the length of the body 120.

Similarly, each of the slidably adjustable clamping members 140 are also adjusted using a tightening knob 145 which further includes a threaded shaft 146 extending through the surface of each of the slidably adjustable clamping members 140 and into one of the slidable retention members (410 of FIG. 4) within the slot (400 of FIG. 4) of the body 120 of the multi-position biscuit cutting guide 100. As with the slidably adjustable guide blocks 110, the slidably adjustable clamping members 140 are positioned and fixed in place by turning the tightening knob 145 clockwise to create a tight frictional engagement. Again, turning the tightening knob 145 counterclockwise serves to release the tight frictional engagement so that the slidably adjustable clamping member 140 is free to be repositioned.

In a similar manner, the clamping member adjustment block 150 is also adjusted using a tightening knob 155 which further includes a threaded shaft 156 extending through the surface of the clamping member adjustment block 150 and into one of the slidable retention members (410 of FIG. 4) within the slot (400 of FIG. 4) of the body 120 of the multi-position biscuit cutting guide 100. As with the slidably adjustable guide blocks 110, the clamping member adjustment block 150 is positioned and fixed in place by turning the tightening knob 155 clockwise to create a tight frictional engagement. Again, turning the tightening knob 155 counterclockwise serves to release the tight frictional engagement so that the clamping member adjustment block 150 is free to be repositioned.

As noted above, the slidably adjustable guide blocks 110 enable accurate and repeatable cutting of biscuit slots in the surface of a work piece. This is accomplished because each of the slidably adjustable guide blocks 110 includes centering marks or the like 160 in their surfaces for precisely and repeatably locating the slidably adjustable guide blocks with respect to the scale 130 on the surface of the body 120. Further, each of the slidably adjustable guide blocks 110 also includes a guide mark 165 along their centerline for accurately and repeatably locating and positioning a plate joiner tool or the like when cutting biscuit slots into the surface of a work piece.

As illustrated by FIG. 1 and FIG. 2, each slidably adjustable stop block or clamping member 140 includes a vertical clamping member 170 in slidable engagement with the clamping member 140. The vertical clamping member 170 includes a horizontal slot 175 extending through the vertical member. A tightening knob 180 having a threaded shaft 185 extends through the horizontal slot 175, and threads into the clamping member 140. Consequently, the vertical clamping member 170 is free to be moved up and down, relative to the clamping member 140, for the length of the horizontal slot 175. However, once the vertical clamping member is placed in the desired position, the tightening knob 180 is rotated clockwise, and the vertical clamping member 170 is held in tight frictional engagement against the clamping member 140. Rotating the tightening knob 180 counterclockwise serves to free the vertical clamping member 170 so that is free to be repositioned.

As noted above, the clamping member adjustment block 150 is used for making fine adjustments to the adjacent clamping member 140 for the purpose of more securely holding work pieces in place during use of the multi-position biscuit cutting guide 100. In particular, the clamping member adjustment block 150 includes a tightening knob 190 having a threaded shaft 196 that extends through a threaded channel 195 within the body of the clamping member adjustment block so that it contacts the outer surface of the adjacent clamping member 140. Consequently, when the clamping member adjustment block is fixed in place as described above, rotating the tightening knob 190 clockwise serves to force the threaded shaft 196 against the adjacent clamping member 140, which is in turn forced tightly against an included work piece (See 300 of FIG. 3). Once this step has been completed, the adjacent clamping member 140 is fixed in place as described above to securely hold the work piece in place.

Figure 8:
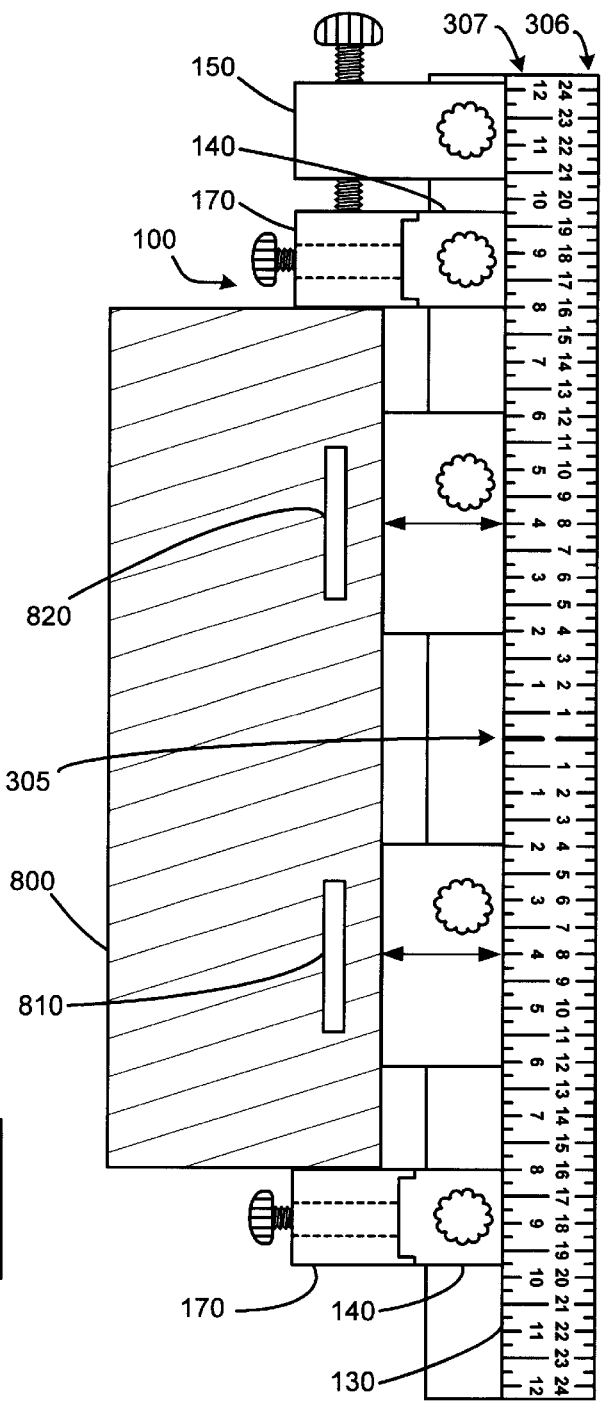
FIG. 8 is a top view of the multi-position biscuit cutting guide of FIG. 3, shown holding a work piece in an alternate position for cutting biscuit slots into an upper surface of the work piece in accordance with the present invention.

Further, in an alternate embodiment of the scale 130, as illustrated by FIG. 3, and FIG. 8, the scale is a "dual scale," having two parallel rows of distance or measurement indicators providing an outer scale 306, and an inner scale 307. Each of these scales, 306 and 307 are calibrated outwards to the left and right from a center point indicator 305 of the scale 130. Therefore, each scale 306 and 307 provides a measurement of the distance to the left and to the right from the center point indicator 305 of the scale 130. Further, the inner scale 307 provides a one-to-one measurement indicator of the distance to the left and to the right from the center point indicator 305, while the outer scale 306 provides a half-scale, or two-to-one, measurement indicator of the distance to the left and to the right from the center point indicator. Consequently, it is clear that the outer scale 306 will read exactly twice the distance from the center point indicator 305 at any given point along the scale 130 than will the inner scale 307. A preferred mode of operation of this dual scale embodiment of the scale 130 is discussed in detail below with respect to FIG. 8.

Operation

The following discussion provides an exemplary description of a preferred mode of operation. This discussion is intended for illustrative purposes only, and is not intended to limit the scope of the invention. The following discussion describes methods for using the multi-position biscuit cutting guide 100 of the present invention for ensuring accurate, repeatable, and matching cutting of biscuit slots within one or more work pieces in accordance with the present invention with reference to FIG. 3 through FIG. 9.

In particular, FIG. 3 is a top view of the multi-position biscuit cutting guide shown holding a work piece 300 in position for cutting biscuit slots into a surface of the work piece in accordance with the present invention. FIG. 4 is a side view of the multi-position biscuit cutting guide of FIG. 3 shown with the work piece 300 clamped in place for cutting biscuit slots into the surface of the work piece. Note that as illustrated by FIG. 4, the vertical clamping members 170 extend down over the edge of the work piece 300 to hold the work piece in place as the multi-position biscuit cutting guide 100 rests on the surface of the work piece.

Figure 5:
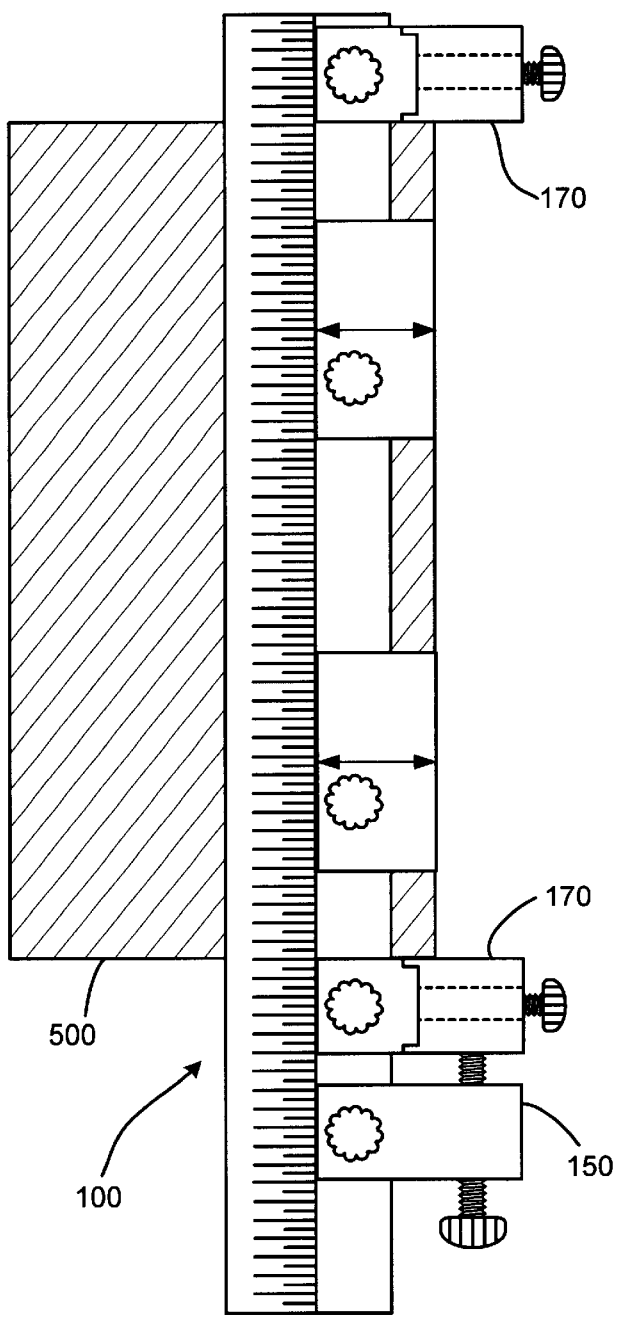
FIG. 5 is a top view of the multi-position biscuit cutting guide of FIG. 1, shown holding a work piece in position for cutting biscuit slots into an edge of the work piece in accordance with the present invention.
Figure 6:
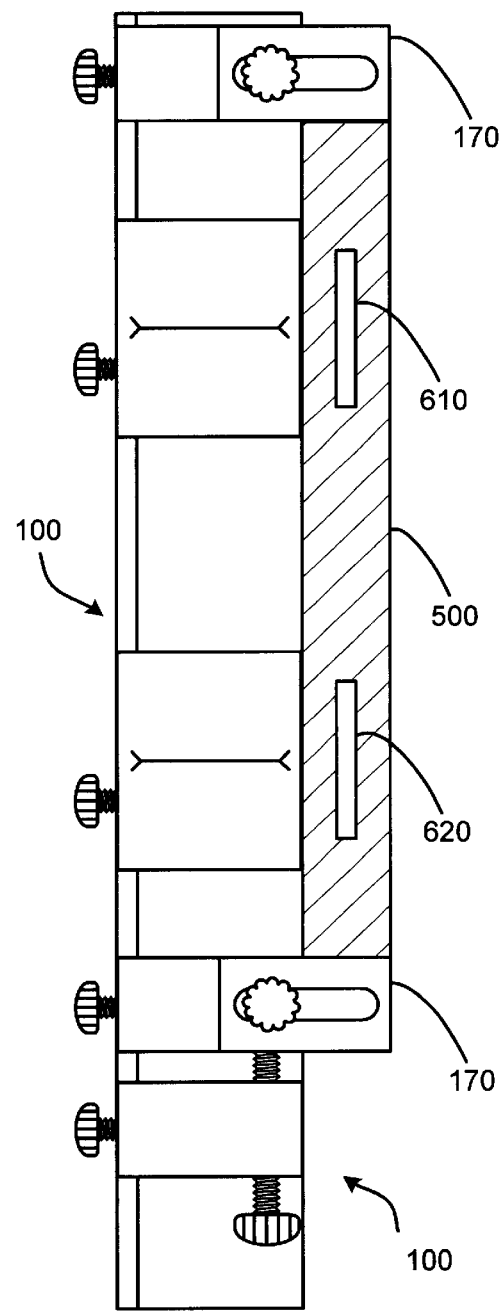
FIG. 6 is a front view of the multi-position biscuit cutting guide of FIG. 5 shown with the work piece clamped in place for cutting biscuit slots into the edge of the work piece.

FIG. 5 is a top view of the multi-position biscuit cuffing guide 100, shown holding a work piece 500 in position for cutting biscuit slots into an edge of the work piece in accordance with the present invention. Note the difference in position between the work piece 300 in FIG. 3 and the work piece 500 in FIG. 5. In the position of FIG. 3, the plate joiner tool is used in a vertical orientation to cut biscuit slots 310 and 320 into the surface of the work piece 300. In the position illustrated by FIG. 5 and FIG. 6, the plate joiner tool is used in a horizontal orientation to cut biscuit slots 610 and 620 into the edge of the work piece 500. In fact, FIG. 6 is a front view of the multi-position biscuit cutting guide of FIG. 5 shown with the work piece 500 clamped in place for cutting biscuit slots 610 and 620 into the edge of the work piece. Again, note that that as illustrated by FIG. 6, the vertical clamping members 170 extend down over the edge of the work piece 500 to hold the work piece in place as the multi-position biscuit cutting guide 100 rests on the surface of the work piece.

As noted above, during operation of the multi-position biscuit cutting guide 100, a plate joiner tool or the like is used to cut one or more plate or biscuit slots within a work piece which is held in position relative to the slidably adjustable guide members. In particular, as illustrated by FIG. 3 and FIG. 4, a work piece 300 is held in place between the slidably adjustable stop blocks 140 disposed on either end of the body 120 of the multi-position biscuit cutting guide 100. To hold the work piece in place, the slidably adjustable stop block 140 opposite the clamping member adjustment block 150 is fixed in place as described above. Next, the work piece is placed into position within the multi-position biscuit cutting guide 100, with one edge in contact with the slidably adjustable stop block 140 opposite the clamping member adjustment block 150.

Next, the slidably adjustable stop block 140 adjacent to the clamping member adjustment block 150 is placed in contact with an opposite edge of the work piece. The clamping member adjustment block 150 is then fixed in place with the threaded shaft 196 of the tightening knob 195 in contact with the slidably adjustable stop block 140 adjacent to the clamping member adjustment block. The tightening knob 195 is then rotated clockwise, as describe above, to force the slidably adjustable stop block 140 adjacent to the clamping member adjustment block 150 tightly against the work piece 300. The slidably adjustable stop block 140 adjacent to the clamping member adjustment block 150 is then fixed in place as described above. At this point, the work piece 300 is securely held between the two slidably adjustable stop blocks 140.

Once the work piece 300 has been secured as described above, one or more of the slidably adjustable guide blocks 110 are located with respect to the scale 130 on the surface of the body 120. The slidably adjustable guide blocks 110 are then fixed in place as described above. However, it should be noted that the slidably adjustable guide blocks 110 may be fixed in any desired locations prior to securing the work piece 300 between the two slidably adjustable stop blocks 140, such as is the case when placing subsequent work pieces into the multi-position biscuit cutting guide 100.

As described above, each of the slidably adjustable guide blocks 110 includes a centerline marking 165 along the front face to allow for centering of the plate joiner tool with respect to each guide block. Once the plate joiner tool has been centered against one of the guide blocks 110, it is used to cut one or more plate or biscuit slots 310 and 320, see FIG. 3, into a first work piece 300 in positions corresponding to the centerlines of the guide blocks. Once the plate or biscuit slots 310 and 320 have been cut into the work piece 300, the work piece is removed from the multi-position biscuit cutting guide 100, and a corresponding work piece 500, see FIG. 5, is then placed into the multi-position biscuit cutting guide. Once the plate joiner tool has been centered against one of the guide blocks 110, it is used to cut one or more plate or biscuit slots 610 and 620, see FIG. 6, into the corresponding work piece 500 in positions corresponding to the centerlines of the guide blocks.

Figure 7:
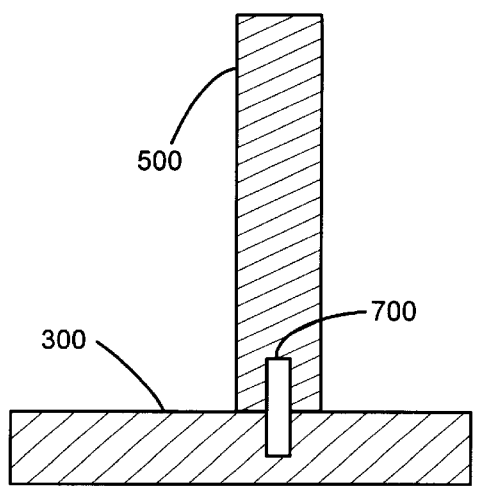
FIG. 7 is a cross-sectional view of the work pieces of FIG. 3 and FIG. 6, shown with aligned biscuit slots for joining the two work pieces in a conventional T-joint.

So long as the stop blocks 140 and slidably adjustable guides 110 are not repositioned when adding the subsequent work piece 500 to the multi-position biscuit cutting guide 100, any plate or biscuit slots cut into any subsequent work pieces will be in exact alignment with slots cut into prior work pieces. In this manner, the multi-position biscuit cutting guide 100 allows for cutting of plate or biscuit slots into corresponding work pieces, which may then be joined using adhesives and plates or biscuits in a conventional manner as illustrated by FIG. 7. In particular, FIG. 7 illustrates a conventional T-Joint formed by joining the work pieces of FIG. 3 and FIG. 6, i.e., work pieces 300 and 500, using conventional biscuits or plates 700.

Figure 9:
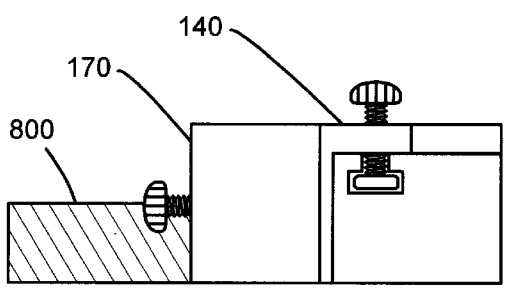
FIG. 9 is a side view of the multi-position biscuit cutting guide of FIG. 8 shown with the work piece clamped in place for cutting biscuit slots into the surface of the work piece.

Further, as illustrated by the top view and side view of the multi-position biscuit cutting 100 provided in FIG. 8 and FIG. 9, respectively, a work piece 800 may also be held in an alternate position for cutting biscuit slots into the surface of that work piece in accordance with the present invention. Note that in the position illustrated by FIG. 8 and FIG. 9, the vertical clamping members 170 extend down over the edge of the work piece 800, but are fully raised, rather than extending downwards as illustrated by FIG. 4 and FIG. 6 in the case where the multi-position biscuit cutting guide 100 is resting on the work piece as described above. The position illustrated by FIG. 8 and FIG. 9 allows both the work piece 800 and the multi-position biscuit cutting guide 100 to rest on a flat surface, with the work piece being held in position by the vertical clamping members 170 while being butted up against the slidably adjustable guide blocks 110. In this position, the plate joiner tool is used to cut biscuit slots 810 and 820 into the surface of the work piece 800 in the manner described above.

In addition, FIG. 8 also illustrates a preferred operation of the dual scale embodiment of the scale 130, as discussed above. The dual scale embodiment of the scale 130 serves two basic functions. First, because the outer scale 306 is a half-scale indicator for measuring the distance to the left and right of the center point 305 of the scale 130, a work piece of a given length may be quickly and easily centered along the length of the scale. For example, as illustrated by FIG. 8, where the work piece has a length of sixteen inches long, it is centered by simply positioning the clamping members 140 at the sixteen-inch mark to the left and right of the center point 305 of the scale 130. The work piece 800 is then positioned between the two clamping members 140, which are then tightened in place as described above to securely hold the work piece in position.

The inner scale 307 is used to position the guide blocks 110 for positioning the plate joiner tool for cutting the biscuit slots 810 and 820 in the manner described above. In particular, because the center point 305 of the scale 130 is clearly marked, and because the work piece is centered with respect to the center mark as described above, the guide blocks 110 may be easily, accurately, and symmetrically spaced along the length of the work piece 800. Further, because it is often desirable to place a biscuit slot at the center of a work piece, with additional biscuit slots equidistant from the center, a guide block 110 can be positioned at the center point 305 of the scale 130, with additional guide blocks 110 placed at corresponding distances to the left and right of the center point 305.

Finally, using any of the aforementioned embodiments of the multi-position biscuit guide 100, adjustment of the guide blocks 110 and stop blocks 140 need only be done once. Once these adjustments have been made, any number of identical or corresponding work pieces may have plate or biscuit slots cut into their surfaces or edges without the need to measure or mark the desired positions of those slots on each work piece. In addition, once the multi-position biscuit cutting guide 100 has been placed into the desired configuration, it does not require further adjustment to be used with any number of work pieces. Consequently, use of such a multi-position biscuit cutting guide 100 serves to increase accuracy and alignment of cutting biscuit slots into corresponding work pieces while simultaneously reducing production time, and thus cost, when cutting biscuit slots into identical or corresponding work pieces.

The foregoing description of the invention has been presented for the purposes of illustration and description. It is not intended to be exhaustive or to limit the invention to the precise form disclosed. Many modifications and variations are possible in light of the above teaching. For example, one or more of the aforementioned embodiments may be combined to produce a plurality of hybrid embodiments of multi-position biscuit cutting guide 100, in accordance with the present invention. Thus, it is intended that the scope of the invention be limited not by this detailed description, but rather by the claims appended hereto.

What is claimed is:

1. An adjustable guide for positioning a slot-cutting tool with respect to a work piece, comprising:
    an elongated member forming a body of the adjustable guide;
    a first clamping member slidably coupled along the length of the body, at a first end of the body;
    a second clamping member slidably coupled along the length of the body, at a second end of the body;
    at least one tool guide member slidably coupled along the length of the body between the first and second clamping members; and
    wherein the slot-cutting tool is aligned with at least one of the tool guide members for cutting at least one slot into a surface of a work piece held between the first and second clamping members.

2. The adjustable guide of claim 1 further comprising a clamping member adjustment block slidably coupled along the length of the body in association with the first clamping member, and wherein the clamping member adjustment block is used for making fine adjustments to the position of the first clamping member.

3. The adjustable guide of claim 1 further comprising a graduated scale coupled to a top surface of the body for use in precisely positioning at least one of the tool guide members.

4. The adjustable guide of claim 3 wherein the graduated scale is a dual scale, comprising an outer scale and an inner scale.

5. The adjustable guide of claim 4 wherein the outer scale is used for centering the work piece with respect to the graduated scale, and wherein the inner scale is used for positioning at least one of the tool guide members with respect to the graduated scale.

6. The adjustable guide of claim 3 wherein each of the tool guide members further includes a centering mark on its upper surface for precisely aligning each tool guide member with respect to the graduated scale.

7. The adjustable guide of claim 1 wherein each of the tool guide members further includes a centering mark on a front face for precisely aligning the slot-cutting tool with at least one of the tool guide members for cutting at least one slot into the surface of the work piece.

8. The adjustable guide of claim 1 wherein each clamping member further includes a tightening knob coupled to a threaded shaft, the shaft extending through each clamping member and into a retention member slidably disposed within a slot within the body of the adjustable guide.

9. The adjustable guide of claim 1 wherein each clamping member is capable of being securely fixed in a desired position relative to a graduated scale coupled to a top surface of the body by rotating the associated tightening knob.

10. The adjustable guide of claim 1 wherein each tool guide member further includes a tightening knob coupled to a threaded shaft, the shaft extending through each tool guide member and into a retention member slidably disposed within a slot within the body of the adjustable guide.

11. The adjustable guide of claim 1 wherein each tool guide member is capable of being securely fixed in a desired position relative to a graduated scale coupled to a top surface of the body by rotating the associated tightening knob.

12. The adjustable guide of claim 1 wherein the first and second clamping members further include a first and second vertical clamping member, respectively, each vertical clamping member slidably coupled to its respective first or second clamping member, and wherein each vertical clamping member is capable of securely engaging a work piece for holding the work piece in position for cutting at least one slot into the surface of the work piece.

13. The adjustable guide of claim 1 wherein each of the first and second clamping members and each of the tool guide members is secured in a desired location relative to a graduated scale coupled to a top surface of the body using a clamping mechanism coupled to each of the first and second clamping members and each of the tool guide members.

14. An adjustable guide assembly comprising:
an elongated rectangular member forming a body of the adjustable guide assembly;
a first clamping member slidably coupled to a first end of the body;
a second clamping member slidably coupled to a second end of the body;
at least one tool guide member slidably coupled to the body between the first and second clamping members;
a graduated scale coupled to a top surface of the body for use in precisely positioning at least one of the tool guide members along a length of the body; and
wherein each of the tool guide members is capable of precisely aligning a slot-cutting tool with respect to a work piece which is securely held in position between the first and second clamping member.

15. The adjustable guide assembly of claim 14 wherein the first and second clamping members and each of the tool guide members further include a centering mark on their respective upper surfaces for precisely aligning the first and second clamping members and each of the tool guide members with respect to the graduated scale.

16. The adjustable guide assembly of claim 14 wherein the graduated scale is a dual scale, comprising an outer scale and an inner scale, wherein the outer scale is used for centering the work piece with respect to the graduated scale, and wherein the inner scale is used for positioning at least one of the tool guide members with respect to the graduated scale.

17. The adjustable guide of claim 14 wherein each of the tool guide members further includes a centering mark on a front face for precisely aligning the slot-cutting tool with at least one of the tool guide members for cutting at least one slot into the surface of the work piece.

18. The adjustable guide of claim 14 wherein each of the first and second clamping members and each of the tool guide members is secured in a desired location along the length of the body relative to the graduated scale on the body using a clamping mechanism coupled to each of the first and second clamping members and each of the tool guide members.

19. A method for ensuring accurate, repeatable and matching cutting of biscuit slots within work pieces, comprising:
an elongated body having clamping members slidably coupled on either end of the body;
securely clamping a work piece between the clamping members;
positioning at least one plate joiner tool guide along a length of the body, between the clamping members, each plate joiner tool guide being slidably coupled to the body;
securely fixing the position of at least one plate joiner tool guide using a clamping mechanism coupled to each plate joiner tool guide; and
using at least one of the plate joiner tool guides for precisely aligning a plate joiner tool for cutting at least one slot into a surface of the work piece.

20. The method of claim 19 wherein a graduated scale is coupled to a top surface of the elongated body for precisely aligning each of the clamping members and each of the plate joiner tool guides along the length of the body.

21. The method of claim 19 wherein a graduated scale comprising an outer scale and an inner scale is coupled to a top surface of the elongated body, and wherein the outer scale is used for precisely aligning each of the clamping members with respect to the graduated scale, and wherein the inner scale is used for positioning at least one of the plate joiner tool guides with respect to the graduated scale.

22. The method of claim 20 wherein each of the clamping members and each of the plate joiner tool guides further includes a centering mark on their upper surfaces for precisely aligning each of the clamping members and each of the plate joiner tool guides with respect to the graduated scale.

23. The method of claim 19 wherein each of the plate joiner tool guides further includes a centering mark on a front face for precisely aligning the plate joiner tool for cutting at least one slot into the surface of the work piece.

24. The method of claim 19 wherein a clamping member adjustment block is slidably coupled along the length of the body in association with one of the clamping members for making fine adjustments to the position of that clamping member.

* * * * *